United States Patent
Baumbach et al.

(10) Patent No.: US 9,090,223 B2
(45) Date of Patent: Jul. 28, 2015

(54) AIRBAG DEVICE

(71) Applicants: TK HOLDINGS INC., Auburn Hills, MI (US); HONDA MOTOR CO., LTD., Tokyo (JP)

(72) Inventors: Eric Joseph Baumbach, Auburn Hills, MI (US); Nathaniel Robert Saunders, Westerville, OH (US); Tatsuya Yuki, Auburn Hills, MI (US); Mark Andrew Steinbach, Auburn Hills, MI (US); Andrew Jack Pitonyak, Auburn Hills, MI (US)

(73) Assignees: TK HOLDINGS INC., Auburn Hills, MI (US); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/253,314

(22) Filed: Apr. 15, 2014

(65) Prior Publication Data

US 2014/0306431 A1  Oct. 16, 2014

Related U.S. Application Data

(60) Provisional application No. 61/812,360, filed on Apr. 16, 2013.

(51) Int. Cl.
*B60R 21/237* (2006.01)
*B60R 21/213* (2011.01)

(52) U.S. Cl.
CPC ............. *B60R 21/237* (2013.01); *B60R 21/213* (2013.01)

(58) Field of Classification Search
CPC .... B60R 21/213; B60R 21/232; B60R 21/237
USPC ................. 280/728.2, 730.2, 743.1
See application file for complete search history.

(56) References Cited

U.S. PATENT DOCUMENTS

| 5,501,489 | A | | 3/1996 | Folsom et al. | |
|---|---|---|---|---|---|
| 5,697,640 | A | * | 12/1997 | Lalonde ...................... | 280/743.1 |
| 6,186,534 | B1 | * | 2/2001 | Heinz ......................... | 280/728.2 |
| 6,371,512 | B1 | * | 4/2002 | Asano et al. ................ | 280/730.2 |
| 7,588,264 | B2 | | 9/2009 | Miyata | |
| 7,766,376 | B2 | * | 8/2010 | Yokoyama .................. | 280/730.2 |
| 7,770,919 | B2 | | 8/2010 | Mendez | |
| 7,806,433 | B2 | * | 10/2010 | Mitsuo et al. .............. | 280/730.2 |
| 8,550,494 | B2 | * | 10/2013 | Ochiai et al. ............... | 280/730.2 |
| 8,801,030 | B2 | * | 8/2014 | Sugimori et al. ........... | 280/730.2 |
| 2002/0096864 | A1 | * | 7/2002 | Asano et al. ................ | 280/730.2 |
| 2005/0242551 | A1 | * | 11/2005 | Noguchi et al. ............ | 280/730.2 |
| 2011/0101658 | A1 | | 5/2011 | Konishi et al. | |
| 2012/0286500 | A1 | * | 11/2012 | Wiik et al. .................. | 280/730.2 |
| 2013/0056965 | A1 | * | 3/2013 | Sugimori et al. ........... | 280/730.1 |

OTHER PUBLICATIONS

International Search Report mailed Aug. 28, 2014 issued in connection with International Application No. PCT/US2014/034093.
Written Opinion mailed Aug. 28, 2014 issued in connection with International Application No. PCT/US2014/034093.

* cited by examiner

*Primary Examiner* — Paul N Dickson
*Assistant Examiner* — Robert A Coker
(74) *Attorney, Agent, or Firm* — Foley & Lardner LLP

(57) ABSTRACT

An airbag module including an inflator and an inflatable airbag is provided. The inflatable airbag may include a first portion comprising at least one fold configured to form at least one vertical pleat, a second portion comprising at least one fold configured to form at least one horizontal pleat and a third portion configured to form a roll.

19 Claims, 2 Drawing Sheets

AIRBAG DEVICE

CROSS-REFERENCE TO RELATED PATENT APPLICATIONS

This application claims the benefit of and priority to U.S. Provisional Patent Application No. 61/812,360 filed on Apr. 16, 2013, the disclosure of which is incorporated herein by reference in its entirety.

BACKGROUND

The present application relates generally to the field of airbags and occupant protection systems. More specifically, the application relates to a system and method for folding airbag cushions to improve the trajectory of the airbag cushion when it is deployed.

Head-Side Airbags (HSABs) have generally been designed based on a vehicle's occupant seating location. Each occupant's head has typically been protected by an inflated cushion chamber. The deployment trajectory of the HSAB cushion as it is inflated influences the performance and effectiveness of the HSAB. The cushion can become caught on trim members or other devices near the space in which the undeployed HSAB is stored (e.g., A-pillar trim, B-pillar trim, C-pillar trim, D-pillar trim, seatbelt D-rings, etc.). Prior HSABs have been designed with a bracket (e.g., jump bracket, ramp, etc.) formed of metal or a polymer that is disposed between the airbag cushion and a trim member or other device. However, such brackets add cost, complexity, and weight to the HSAB.

SUMMARY

A method of folding a side impact airbag for improved deployment of the airbag is disclosed herein. The method may include providing a side impact airbag with a proximal end coupled to the vehicle frame and a distal end that deploys away from the vehicle frame when the side impact airbag is inflated. A proximal first portion may be folded in vertical accordion-type pleats, an intermediate second portion may be folded in horizontal accordion-type pleats, and a distal third portion may be rolled in a roll opening in an outboard direction.

A head-side airbag module including an inflator and an inflatable airbag is disclosed. The inflatable airbag may include a first portion comprising at least one fold configured to form at least one vertical pleat, a second portion comprising at least one fold configured to form at least one horizontal pleat and a third portion configured to form a roll.

A head-side airbag module may include an inflatable airbag that includes a first portion configured to deploy in an inboard direction, a second portion configured to deploy in a downward direction and a third portion configured to unroll.

A method of forming a head-side airbag module is disclosed. The method may include folding a first portion of an inflatable airbag to form at least one vertical pleat, folding a second portion of an inflatable airbag to form at least one horizontal pleat and rolling a third portion of the airbag. The method may also include attaching an inflator to the inflatable airbag.

It is to be understood that both the foregoing general description and the following detailed descriptions are exemplary and explanatory only, and not restrictive of the inventions.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
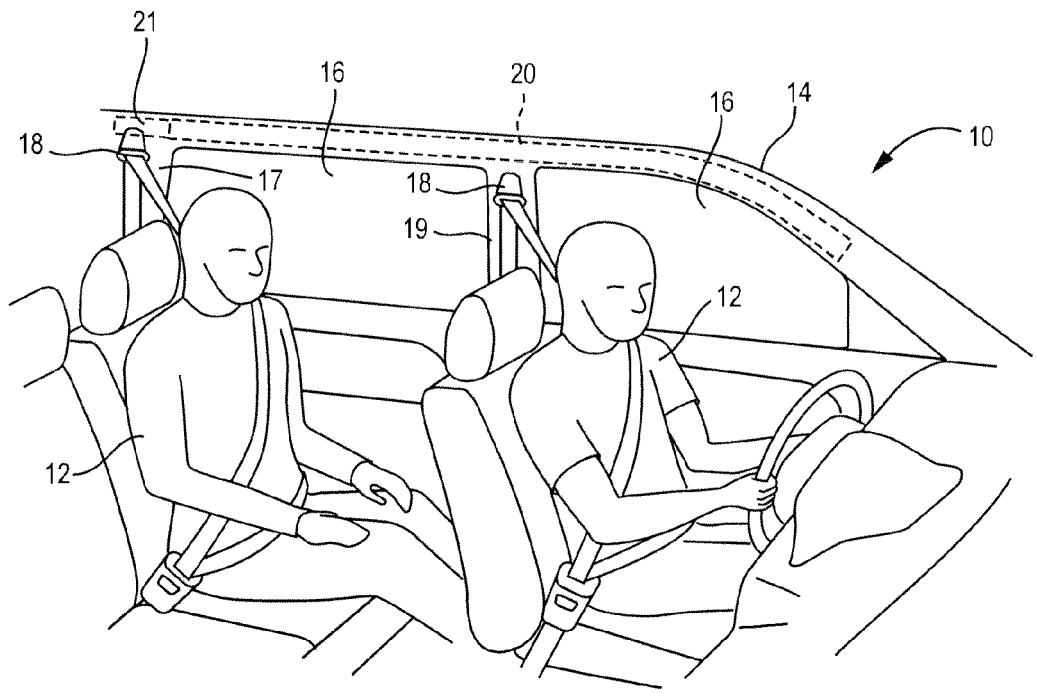
FIG. 1A is a is a perspective view of the interior of a vehicle.
Figure 1B:
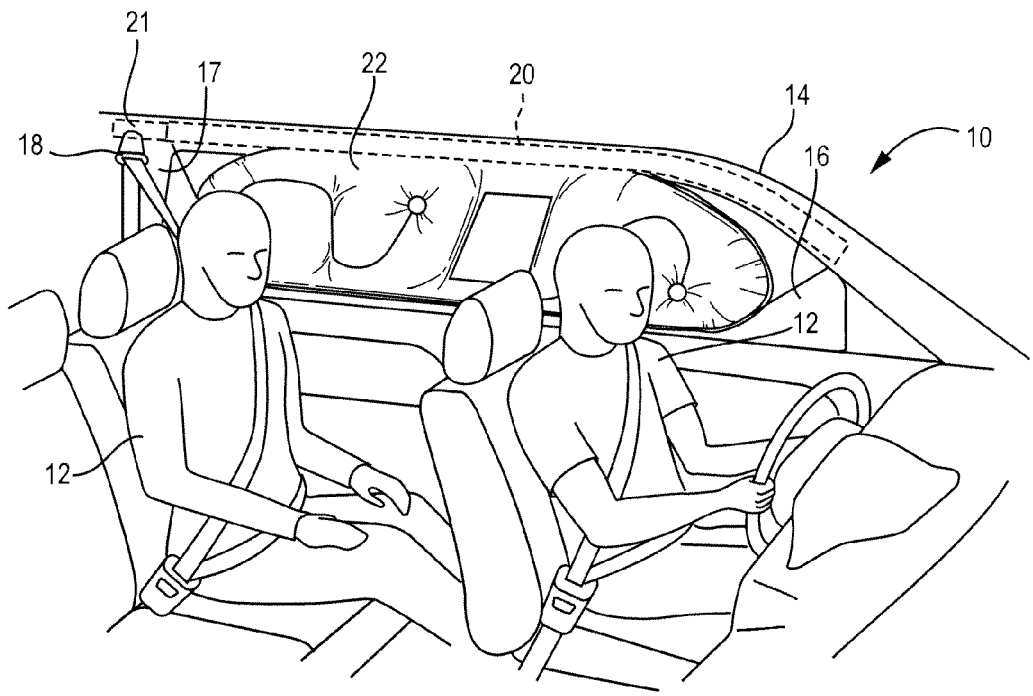
FIG. 1B is a is a perspective view of a head side impact airbag device deployed in the interior of a vehicle.

Referring to FIGS. 1A and 1B, a perspective view of a vehicle interior 10 (e.g., occupant compartment, etc.) is shown. An airbag device, shown as a headside airbag (HSAB) module 20 is positioned in a roof rail 14 of the vehicle. The HSAB module 20 may include an airbag cushion 22 inflated by an inflator 21 or gas generator and at least one connection element coupled between the airbag cushion 22 and a structural member of the vehicle, such as the roof rail 14 above a window opening 16, in a conventional manner. The airbag cushion may be interchangeably referred to as an inflatable airbag. The inflator 21 may be mounted in one of pillars of the vehicle frame (e.g., the B-pillar 19 or the C-pillar 17). Thus, the inflator 21 may be considered a rear or mid mount inflator depending on vehicle configuration and desired airbag deployment characteristics. The airbag cushion 22 may be preferably secured in a folded state beneath a trim panel (not shown). The trim panel may be snapped, screwed, or otherwise secured in place over the inflator 21 and the packed, folded curtain airbag 22.

Referring to FIG. 1B, during a side impact, roll over, frontal impact or frontal offset impact event involving the vehicle, sensors may trigger the inflator 21 or gas generator, which may be located in the roof rail 14 or roof assembly, to rapidly generate and force gas into the airbag cushion 22. The airbag cushion 22 may deploy downwardly away from a storage position and along the side of the interior 10 toward the vehicle occupants 12 to a deployed position. The airbag cushion 22 may expand in the cross-car direction as gas is forced into the cushion 22 by the inflator 21. In the deployed position, the airbag cushion 22 may be disposed between the occupants 12 and the side of the vehicle and may generally cover at least a portion of the window openings 16.

The airbag cushion 22 may generally be formed from a first panel (e.g., inboard panel, inner panel, front panel, etc.) and a second panel (e.g., outboard panel, outer panel, rear panel, etc.) that are coupled together by a plurality of connecting seams. The first panel and the second panel may preferably comprise a nylon fabric. The panels may be sewn together or secured by other suitable methods such as thermobonding or welding. The panels and the connecting seams may be coated with a sealant in order to reduce the leakage of inflation gas. The airbag cushion 22 may be divided into two or more compartments or chambers. Passages or ports may be provided between individual chambers such that the chambers are in fluid communication with each other. The curtain airbag 22 may also include a plurality of un-inflated portions, such as un-inflated portions that generally separate the chambers.

Figure 2:
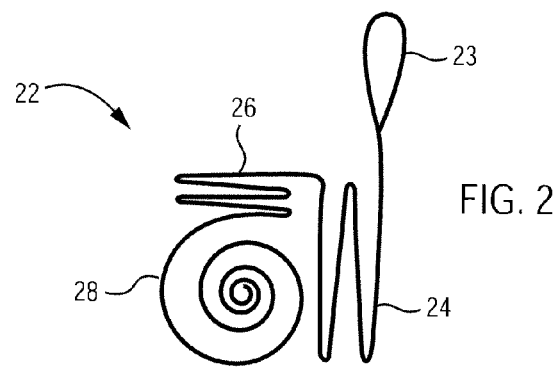
FIG. 2 is a schematic cross-section view of an undeployed head side impact airbag.

Referring now to FIG. 2, the airbag cushion 22 is shown folded into a storage configuration (e.g., for storage along the roof rail 14). The airbag cushion 22 may include a proximal first portion 24 that may be folded into vertical accordion-style pleats (e.g., J-folds), an intermediate second portion 26 that may be folded into horizontal accordion-style pleats (e.g., Z-folds), and a distal third portion 28 that may be rolled.

Figure 3A:
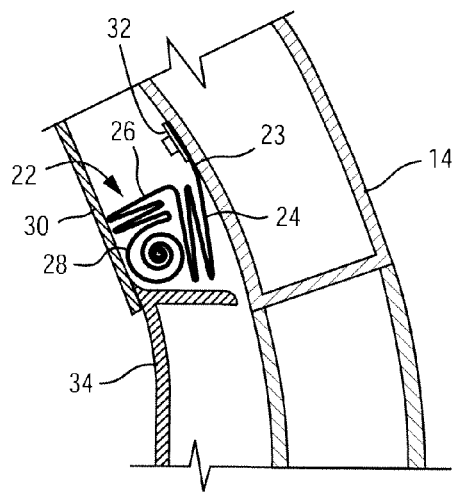
FIGS. 3A-3D are schematic cross-section views of the deployment of the head side impact airbag of FIG. 2 coupled to a vehicle frame.

The distal third portion 28 may be referred to as a main portion of the airbag cushion 22. The arrangement of the cushion 22 as shown in FIG. 3A allows for a compact package that may be concealed and deployed from under a trim member 30 from the roof rail 14. The airbag cushion 22 may be coupled to a structural member such as the roof rail 14 via a tab 23 that extends from the first portion 24.

The first portion 24 may be positioned adjacent the roof rail 14. The first portion 24 may extend along the roof rail 14. The vertical pleats of the first portion 24 may direct the early/initial deployment trajectory of the cushion 22 in an inboard direction. The inboard direction may extend along a horizontal plane. The characteristics of first portion 24 may be tuned by varying the number and dimensions of the folds to direct the rest of the cushion 22 inboard over the top of any obstruction (e.g., trim members, D-rings 18, etc.) during initial deployment of the HSAB module 20. For example, as illustrated in FIG. 2, the cushion may include a first portion 24 with four folds forming similarly sized pleats. The first portion may include at least one fold, two folds, three folds, or more. The folds may be positioned such that the pleats of the first portion 24 are different sizes.

The first portion 24 of a first region of the cushion 22 may have a different number of and/or size of folds than the first portion 24 of a second region of the cushion 22. This enables the trajectory of the cushion 22 to be different in a first region and a second region along the length of the cushion 22. The length of the cushion extending along the side of the vehicle in the direction of travel of the vehicle. The characteristics of the first portion 24 of the cushion may be varied in the fore-aft direction by varying the size and number of folds of the first portion 24 between a front region of the cushion 22 and a rear region of the cushion 22.

The second portion 26 may be positioned inboard from the first portion 24. After the initial inboard trajectory of the cushion 22, the horizontal pleats of the second portion 26 may direct the middle deployment trajectory of the cushion 22 in a downward direction into position for the occupant. The second portion 26 may be configured to direct the cushion 22 in a downward trajectory from the initial inboard trajectory before the cushion 22 contacts the occupant 12. The downward trajectory may extend along a vertical plane. The characteristics of second portion 26 may be tuned by varying the number and dimensions of the folds to direct the rest of the cushion 22 downward clearing any obstructions (e.g., trim members, D-rings, etc.) in an inboard direction during middle deployment of the HSAB module 20. For example, as illustrated in FIG. 2, a second portion 26 may include four folds forming similarly sized pleats. The first portion may include at least one fold, two folds, three folds, or more. The folds may be positioned such that the pleats of the second portion 26 are different sizes.

The third portion 28 of the cushion 22 may be disposed below the second portion and inboard from the first portion 24 such that the first portion 24 is disposed between the third portion 28 and the roof rail 14. The third portion 28 may be rolled in an outboard manner, such that the third portion unrolls toward/against the vehicle window and/or body structure (e.g., the B-pillar 19, the C-pillar 17, etc.) to minimize high load contact with the occupant. In a compacted storage configuration for concealment below a member such as a roof rail trim member 30, the second portion 26 or the first portion 24 may each be wrapped around the roll forming the third portion 28.

Referring now to FIGS. 3A-3D, an airbag cushion 22 is shown in several stages of deployment. The airbag cushion 22 is shown in FIG. 3A in a folded storage configuration for storage along the roof rail 14 in a compact package that may be concealed and deployed from under a trim member 30. One or more tabs 23 of the airbag cushion 22 may be fixed to the roof rail 14 with brackets 32.

Figure 3B:
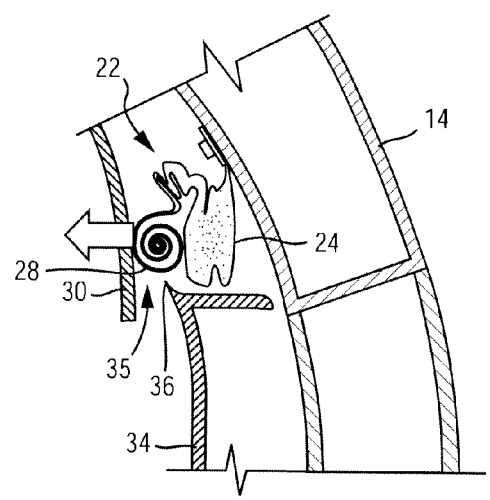

Referring to FIG. 3B, the initial deployment stage of the airbag cushion 22 is shown. The inflation gas from the inflator 21 may first enter the first portion 24 of the airbag cushion 22. The vertical pleats of the first portion 24 may direct the initial deployment trajectory of the cushion 22 in an inboard direction. The airbag cushion may displace the trim member 30. The displacement of the trim member 30 may create a gap 35 between the upper edge 36 of a trim panel 34 covering a vertical frame member (e.g., the B-pillar 19, the C-pillar 17, etc.) and the trim member 30. The initial inboard deployment trajectory may move the second portion 26 and the third portion 28 of the cushion past the upper edge 36 of the trim panel 34 to facilitate the proper deployment of the airbag cushion 22 and reduce the likelihood that the airbag cushion 22 will catch on the trim panel 34.

Figure 3C:
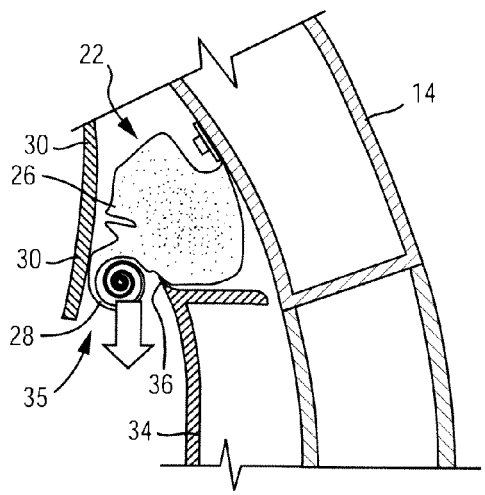

Referring to FIG. 3C, the middle deployment stage of the airbag cushion 22 is shown. As the inflation gas continues to fill the airbag cushion 22, the middle deployment stage may be entered as the first portion 24 continues to expand and the second portion 26 begins to expand. The horizontal pleats of the second portion 26 may direct the deployment of the cushion 22 in a downward direction past the upper edge 36 of the trim panel 34 and through the gap 35 between the trim member 30 and the trim panel 34. The initial inward deployment trajectory of the airbag cushion 22 in the initial deployment stage may position the airbag cushion such that the downward deployment trajectory of the airbag 22 in the middle deployment stage clears obstacles to deployment, such as D-rings 18 coupled to the B-pillar 19 and the C-pillar 17.

Figure 3D:
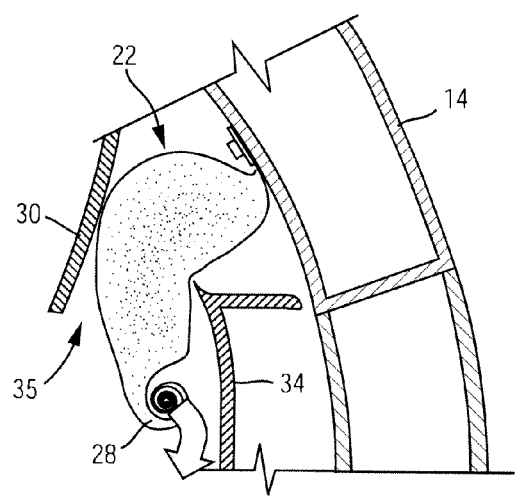

Referring to FIG. 3D, the final deployment stage of the airbag cushion 22 is shown. In the final deployment stage, the inflation gas may cause the third portion 28 of the airbag cushion 22 to unroll in an outboard manner. The outboard unrolling may position the leading edge of the airbag cushion 22 away from an occupant; high load contact with the occupant during deployment of the airbag cushion 22 may therefore be minimized and/or prevented. As the third portion 28 continues to inflate and unroll, the airbag cushion 22 may extend downward. In the fully inflated state, the airbag cushion 22 may be positioned between an upper portion of the occupant and the body structure of the vehicle (e.g., the B-pillar 19, the C-pillar 17, etc.) and/or the vehicle window openings 16, as shown in FIG. 1B.

It is important to note that the construction and arrangement of the head side airbag as shown is illustrative only. Those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced. Other substitutions, modifications, changes and omissions may be made in the design, operating conditions and arrangement of the disclosed head side airbag module and method.

What is claimed:

1. An airbag module comprising:
   an inflator, and
   an inflatable airbag, wherein the inflatable airbag comprises:
   a first portion comprising at least two folds configured to form at least two vertical pleats of different sizes that are configured to initially direct deployment of the inflatable airbag inboard from a roof rail of a vehicle;
   a second portion comprising at least one fold configured to form at least one horizontal pleat; and
   a third portion configured to form a roll.

2. The airbag module of claim 1, wherein the inflatable airbag further comprises at least one tab configured to attach the inflatable airbag to a structural member of a vehicle.

3. The airbag module of claim 1, wherein the second portion comprises at least two pleats of different sizes.

4. The airbag module of claim 1, wherein the third portion is in the form of an outward roll.

5. The airbag module of claim 1, wherein the third portion is configured to be disposed below the second portion when the airbag when the airbag module is installed in a vehicle.

6. The airbag module of claim 1, wherein the first portion is configured to be disposed between the third portion and a structural member of a vehicle when the airbag module is installed in the vehicle.

7. The airbag module of claim 1, wherein at least one of the first portion or the second portion of the inflatable airbag comprises a first region and a second region, wherein the first region is displaced forward of the second region along a length of the inflatable airbag, and wherein the first region comprises at least one of a different number of folds or different sized pleats than the second region.

8. An airbag module comprising:
   an inflator, and
   an inflatable airbag, wherein the inflatable airbag comprises:
   a first portion comprising at least one fold configured to form at least one vertical pleat that is configured to initially direct deployment of the inflatable airbag inboard from a roof rail of a vehicle;
   a second portion comprising at least one fold configured to form at least one horizontal pleat; and
   a third portion configured to form a roll;
   wherein at least one of the first portion or the second portion of the inflatable airbag comprises a first region and a second region, wherein the first region is displaced forward of the second region along a length of the inflatable airbag, and wherein the first region comprises at least one of a different number of folds or different sized pleats than the the second region.

9. An airbag module comprising:
   an inflator, and
   an inflatable airbag, wherein the inflatable airbag comprises:
   a first portion configured to initially direct deployment of the inflatable airbag inboard from a roof rail of a vehicle;
   a second portion comprising at least two pleats of different sizes that are configured to direct deployment of the inflatable airbag in a downward direction from the roof rail; and
   a third portion configured to unroll.

10. The airbag module of claim 9, wherein the first portion is configured to inflate and displace a trim member covering the airbag module when the airbag module is installed in a vehicle.

11. The airbag module of claim 9, wherein the first portion is configured to inflate and displace the second and third portions of the inflatable airbag in an inboard direction, such that the inflatable airbag clears an obstacle to deployment when the airbag module is installed in a vehicle.

12. The airbag module of claim 11, wherein the obstacle to deployment comprises at least one of a D-ring and a trim panel.

13. The airbag module of claim 9, wherein the first portion is configured to inflate and displace the third portion of the inflatable airbag in a downward direction, such that the inflatable airbag clears an obstacle to deployment when the airbag module is installed in a vehicle.

14. The airbag module of claim 13, wherein the obstacle to deployment comprises at least one of a D-ring and a trim panel.

15. The airbag module of claim 9, wherein the third portion is configured to unroll in an outboard manner when the airbag module is installed in a vehicle.

16. A method of forming an airbag module comprising:
   folding a first portion of an inflatable airbag to form at least two vertical pleats of different sizes that are configured to initially direct deployment of the inflatable airbag inboard from a roof rail of a vehicle;
   folding a second portion of an airbag cushion to form at least one horizontal pleat;
   rolling a third portion of the airbag; and
   attaching an inflator to the inflatable airbag.

17. The method of claim 16, wherein folding the second portion comprises forming at least two pleats of different sizes.

18. The method of claim 16, wherein rolling the third portion comprises forming an outward roll.

19. The method of claim 16, wherein folding the first portion comprises folding a first region of the inflatable airbag and a second region of the inflatable airbag, such that the first region comprises at least one of a different number of folds or different sized pleats than the second region, the first region being positioned forward of the second region along a length of the inflatable airbag.

* * * * *